US012612986B2

(12) United States Patent
Shirani et al.

(10) Patent No.: US 12,612,986 B2
(45) Date of Patent: Apr. 28, 2026

(54) QUICK CONDUIT CONNECTION SYSTEM

(71) Applicant: Cameron International Corporation, Houston, TX (US)

(72) Inventors: Alireza Shirani, Houston, TX (US); Curtis Sifford, San Antonio, TX (US); Gustavo Gonzalez, Cypress, TX (US); Enrique Villarroel, Fulshear, TX (US); Joshua Frank, The Woodlands, TX (US); Eric Miller, Houston, TX (US); Ted Mercer, II, Cypress, TX (US); Aleem Khokhar, Spring, TX (US)

(73) Assignee: Cameron International Corporation, Houston, TX (US)

( * ) Notice: Subject to any disclaimer, the term of this patent is extended or adjusted under 35 U.S.C. 154(b) by 193 days.

(21) Appl. No.: 18/560,752

(22) PCT Filed: Jun. 1, 2022

(86) PCT No.: PCT/US2022/031784
§ 371 (c)(1),
(2) Date: Nov. 14, 2023

(87) PCT Pub. No.: WO2022/256415
PCT Pub. Date: Dec. 8, 2022

(65) Prior Publication Data
US 2024/0247742 A1 Jul. 25, 2024

Related U.S. Application Data

(60) Provisional application No. 63/195,479, filed on Jun. 1, 2021.

(51) Int. Cl.
*F16L 33/04* (2006.01)
*E21B 43/26* (2006.01)
*F16L 33/12* (2006.01)

(52) U.S. Cl.
CPC ........... *F16L 33/04* (2013.01); *E21B 43/2607* (2020.05); *F16L 33/12* (2013.01)

(58) Field of Classification Search
CPC .... E21B 43/2607; E21B 17/021; F16L 33/04; F16L 23/08; F16L 33/12
See application file for complete search history.

(56) References Cited

U.S. PATENT DOCUMENTS 1,051,046 A 1/1913 Witzenmann
1,329,760 A 2/1920 Fulton
(Continued)

FOREIGN PATENT DOCUMENTS

CA 2178856 A1 12/1997
CN 209817989 U 12/2019
(Continued)

OTHER PUBLICATIONS

Lillejordet Per, AU-2020385935-A1, Jun. 23, 2022.*
(Continued)

*Primary Examiner* — Matthew Troutman
*Assistant Examiner* — James A Linford
(74) *Attorney, Agent, or Firm* — Kyle R. Miiller

(57) ABSTRACT

A surface well fracturing system having fluid conduits connected to surface fracturing equipment with quick connect systems is provided. In one embodiment, a fracturing system includes a frac pump, a frac supply manifold, and a fracturing fluid conduit connected to route fracturing fluid between the frac pump and the frac supply manifold. The fracturing fluid conduit is connected to the frac pump or to the frac supply manifold by a quick connect apparatus, which includes a segmented clamp having multiple clamp segments mounted on a shared support. Additional systems, devices, and methods are also disclosed.

20 Claims, 11 Drawing Sheets

(56)                References Cited

U.S. PATENT DOCUMENTS

| | | | |
|---|---|---|---|
| 1,615,536 A | 1/1927 | Del Mar | |
| 2,409,128 A * | 10/1946 | Krasberg | F16L 33/04 |
| | | | 24/280 |
| 2,556,544 A | 6/1951 | Johnson | |
| 2,934,095 A | 4/1960 | Lockhart | |
| 3,118,691 A | 1/1964 | Press | |
| 3,233,668 A | 2/1966 | Hamilton | |
| 3,306,637 A | 2/1967 | Press | |
| 3,393,267 A | 7/1968 | Busse | |
| 3,508,768 A | 4/1970 | Hogan | |
| 3,581,775 A | 6/1971 | Dahl | |
| 3,934,902 A | 1/1976 | McNamee | |
| 3,993,100 A | 11/1976 | Pollard et al. | |
| 4,355,961 A | 10/1982 | Riggs | |
| 4,366,864 A | 1/1983 | Gibson et al. | |
| 4,383,554 A | 5/1983 | Merriman | |
| 4,385,018 A | 5/1983 | Kutnyak | |
| 4,405,016 A | 9/1983 | Best | |
| 4,437,691 A | 3/1984 | Laney | |
| 4,452,312 A | 6/1984 | Roblin | |
| 4,559,716 A | 12/1985 | Daughtry et al. | |
| 4,566,168 A | 1/1986 | Stromberg | |
| 4,570,673 A | 2/1986 | Kendrick et al. | |
| 4,603,887 A | 8/1986 | Mayfield et al. | |
| 4,632,432 A | 12/1986 | Reneau | |
| 4,749,047 A | 6/1988 | Taylor | |
| 4,767,136 A | 8/1988 | Lehmann | |
| 4,805,430 A | 2/1989 | Schmitz et al. | |
| 4,998,756 A | 3/1991 | Hart | |
| 5,135,698 A | 8/1992 | Salama et al. | |
| 5,158,326 A | 10/1992 | Anderson et al. | |
| 5,195,589 A | 3/1993 | Mota et al. | |
| 5,244,045 A | 9/1993 | Mota | |
| 5,524,710 A | 6/1996 | Shinn | |
| 5,636,691 A | 6/1997 | Hendrickson et al. | |
| 5,927,344 A | 7/1999 | Nobileau | |
| 6,003,604 A | 12/1999 | Wilkins | |
| 6,004,639 A | 12/1999 | Quigley et al. | |
| 6,006,788 A | 12/1999 | Jung et al. | |
| 6,102,445 A | 8/2000 | Thomas | |
| 6,192,941 B1 | 2/2001 | Mallen-Herrero et al. | |
| 6,234,030 B1 | 5/2001 | Butler | |
| 6,364,024 B1 | 4/2002 | Dallas | |
| 6,609,734 B1 | 8/2003 | Baugh | |
| 6,691,743 B2 | 2/2004 | Espinasse | |
| 6,899,172 B2 | 5/2005 | McLeod et al. | |
| 7,481,239 B2 | 1/2009 | McGuire et al. | |
| 7,934,546 B2 | 5/2011 | McGuire et al. | |
| 8,100,182 B2 | 1/2012 | Smith et al. | |
| 8,110,741 B2 | 2/2012 | Brotzell et al. | |
| 8,241,453 B2 | 8/2012 | Beteri et al. | |
| 8,398,122 B2 | 3/2013 | Crompton et al. | |
| 8,485,262 B1 | 7/2013 | Angers | |
| 8,528,585 B2 | 9/2013 | McGuire | |
| 8,770,277 B2 | 7/2014 | Artherholt | |
| 8,839,867 B2 | 9/2014 | Conrad | |
| 8,905,056 B2 | 12/2014 | Kendrick | |
| 8,960,307 B2 | 2/2015 | Cain et al. | |
| 8,961,070 B1 * | 2/2015 | Mascarenhas | F16L 1/26 |
| | | | 405/170 |
| 8,978,763 B2 | 3/2015 | Guidry | |
| 9,068,450 B2 | 6/2015 | Guidry | |
| 9,175,556 B2 | 11/2015 | Cherewyk et al. | |
| 9,222,345 B2 | 12/2015 | Conrad | |
| 9,255,469 B2 | 2/2016 | Conrad | |
| 9,518,430 B2 | 12/2016 | Guidry | |
| 9,631,469 B2 | 4/2017 | Guidry et al. | |
| 9,670,745 B1 | 6/2017 | Johansen et al. | |
| 9,890,615 B1 | 2/2018 | Shirani et al. | |
| 9,903,190 B2 | 2/2018 | Conrad et al. | |
| 9,915,132 B2 | 3/2018 | Conrad | |
| 9,932,800 B2 | 4/2018 | Guidry | |
| 10,094,195 B2 | 10/2018 | Guidry | |
| 10,132,146 B2 | 11/2018 | Guidry | |
| 10,132,155 B2 | 11/2018 | Coble et al. | |
| 10,161,210 B2 | 12/2018 | Thornburrow | |
| 10,323,475 B2 | 6/2019 | Christopherson et al. | |
| 10,385,643 B2 | 8/2019 | Guidry | |
| 10,385,645 B2 | 8/2019 | Guidry | |
| 10,385,662 B2 | 8/2019 | Conrad | |
| 10,400,538 B2 | 9/2019 | Roesner | |
| 10,443,763 B2 | 10/2019 | Green et al. | |
| 10,487,637 B2 | 11/2019 | Guidry et al. | |
| 11,319,757 B2 | 5/2022 | Robinson et al. | |
| 11,391,374 B1 * | 7/2022 | Ellisor | F04B 53/164 |
| 2003/0205378 A1 | 11/2003 | Wellington et al. | |
| 2003/0205385 A1 | 11/2003 | Duhn et al. | |
| 2004/0251020 A1 | 12/2004 | Smith | |
| 2005/0063786 A1 | 3/2005 | Trepka | |
| 2006/0207763 A1 | 9/2006 | Hofman | |
| 2007/0125544 A1 | 6/2007 | Robinson et al. | |
| 2007/0227722 A1 | 10/2007 | Atencio | |
| 2008/0083539 A1 | 4/2008 | Hickie | |
| 2008/0277120 A1 | 11/2008 | Hickie | |
| 2009/0014184 A1 | 1/2009 | Voss et al. | |
| 2009/0090515 A1 | 4/2009 | Chan et al. | |
| 2009/0145597 A1 | 6/2009 | Cherewyk | |
| 2009/0261575 A1 | 10/2009 | Bull et al. | |
| 2010/0032031 A1 | 2/2010 | Neal | |
| 2010/0051261 A1 | 3/2010 | Koleilat et al. | |
| 2010/0230114 A1 | 9/2010 | Jennings | |
| 2010/0300672 A1 | 12/2010 | Childress et al. | |
| 2011/0030963 A1 | 2/2011 | Demong et al. | |
| 2011/0079399 A1 | 4/2011 | Nguyen et al. | |
| 2011/0108275 A1 | 5/2011 | Borak et al. | |
| 2011/0114320 A1 | 5/2011 | Sponchia et al. | |
| 2011/0132596 A1 | 6/2011 | Yeh et al. | |
| 2011/0259584 A1 | 10/2011 | Broussard | |
| 2012/0152564 A1 | 6/2012 | Peltier | |
| 2012/0155813 A1 | 6/2012 | Quigley et al. | |
| 2012/0181015 A1 | 7/2012 | Kajaria et al. | |
| 2012/0181016 A1 | 7/2012 | Kajaria et al. | |
| 2012/0181030 A1 | 7/2012 | Kajaria et al. | |
| 2012/0227814 A1 | 9/2012 | Kendrick | |
| 2012/0242081 A1 | 9/2012 | Keays et al. | |
| 2013/0284455 A1 | 10/2013 | Kajaria et al. | |
| 2014/0007970 A1 | 1/2014 | Dodds | |
| 2014/0238683 A1 | 8/2014 | Korach et al. | |
| 2015/0083426 A1 | 3/2015 | Lesko et al. | |
| 2015/0159458 A1 | 6/2015 | Tan et al. | |
| 2015/0211342 A1 | 7/2015 | Shaw et al. | |
| 2015/0275629 A1 | 10/2015 | Hatton | |
| 2015/0345272 A1 | 12/2015 | Kajaria et al. | |
| 2015/0354313 A1 | 12/2015 | McClinton et al. | |
| 2016/0186506 A1 | 6/2016 | Sha et al. | |
| 2016/0305515 A1 | 10/2016 | Leffer et al. | |
| 2016/0363242 A1 | 12/2016 | De Nora | |
| 2017/0175905 A1 | 6/2017 | Martino et al. | |
| 2017/0298700 A1 | 10/2017 | Robichaux et al. | |
| 2017/0314379 A1 | 11/2017 | Guidry | |
| 2018/0264604 A1 | 9/2018 | Baugh et al. | |
| 2018/0291718 A1 | 10/2018 | Conrad et al. | |
| 2019/0292870 A1 * | 9/2019 | Goy | E21B 47/06 |
| 2019/0360624 A1 | 11/2019 | Waller | |
| 2020/0088021 A1 | 3/2020 | Guidry | |
| 2020/0115983 A1 | 4/2020 | Nanney | |
| 2020/0131877 A1 | 4/2020 | Guidry | |
| 2020/0131889 A1 | 4/2020 | Robinson et al. | |
| 2020/0141196 A1 | 5/2020 | Young | |
| 2020/0277845 A1 | 9/2020 | Kajaria | |
| 2021/0010358 A1 | 1/2021 | Guidry et al. | |
| 2021/0025264 A1 | 1/2021 | Shirani | |
| 2021/0025529 A1 * | 1/2021 | Wells | F16L 41/06 |

FOREIGN PATENT DOCUMENTS

| | | | |
|---|---|---|---|
| CN | 111878649 A | 11/2020 | |
| DE | 3617199 A1 * | 11/1987 | F16L 33/12 |
| EP | 0670413 A2 | 9/1995 | |

(56)     References Cited

FOREIGN PATENT DOCUMENTS

| EP | 1101997 | A1 | 5/2001 |
| JP | 06008889 | U | 2/1994 |

OTHER PUBLICATIONS

Texas Oil tools: Well Intervention Equipment brochure, 2016, National Oilwel Varco, Houston, Texas, United States of America (15 pages).
Hydraulic Latch Assembly, webpage available at https://www.f-e-t.com/products/completions/well-intervention/pressure-control-equipment/hydraulic-latch-assembly on Jan. 19, 2019, Forum Energy Technologeis, Houston, Texas, United States of America (4 pages).
International Search Report and Written Opinion issued in the PCT Application PCT/US2020/065827 dated Apr. 13, 2021 (12 pages).
International Search Report and Written Opinion issued in the PCT Application PCT/US2022/031784 dated Sep. 8, 2022 (11 pages).

* cited by examiner

QUICK CONDUIT CONNECTION SYSTEM

CROSS-REFERENCE TO RELATED APPLICATION

This application is a National Stage Entry of International Patent Application No. PCT/US2022/031784, filed on Jun. 1, 2022, which claims benefit of U.S. Provisional Patent Application No. 63/195,479, filed Jun. 1, 2021, which is incorporated by reference herein in its entirety.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

Additionally, such wellhead assemblies may use a fracturing tree and other components to facilitate a fracturing process and enhance production from a well. As will be appreciated, resources such as oil and natural gas are generally extracted from fissures or other cavities formed in various subterranean rock formations or strata. To facilitate extraction of such resources, a well may be subjected to a fracturing process that creates one or more man-made fractures in a rock formation. This facilitates, for example, coupling of pre-existing fissures and cavities, allowing oil, gas, or the like to flow into the wellbore. Such fracturing processes typically include injecting a fracturing fluid—which is often a mixture including sand and water—into the well to increase the well's pressure and form the man-made fractures. A fracturing manifold may provide fracturing fluid to one or more fracturing trees via fracturing lines (e.g., pipes).

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Some embodiments of the present disclosure generally relate to fracturing fluid delivery systems. More specifically, some embodiments relate to a quick surface connection system for connecting fluid conduits, such as hoses or other flexible fluid conduits, to surface fracturing equipment, such as frac pumps or frac missiles. This system of some embodiments is designed for use in onshore fracturing operations, surface fracturing, and any other surface applications. In one embodiment, a quick connect apparatus includes a support plate having a segmented clamp for connecting a fracturing fluid conduit to a frac pump or a frac manifold. The quick connect apparatus can include a landing porch and alignment features to facilitate make-up of the fracturing fluid conduit to the apparatus. Make-up may be performed manually by an operator or in an automated manner.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figures 1, 2:
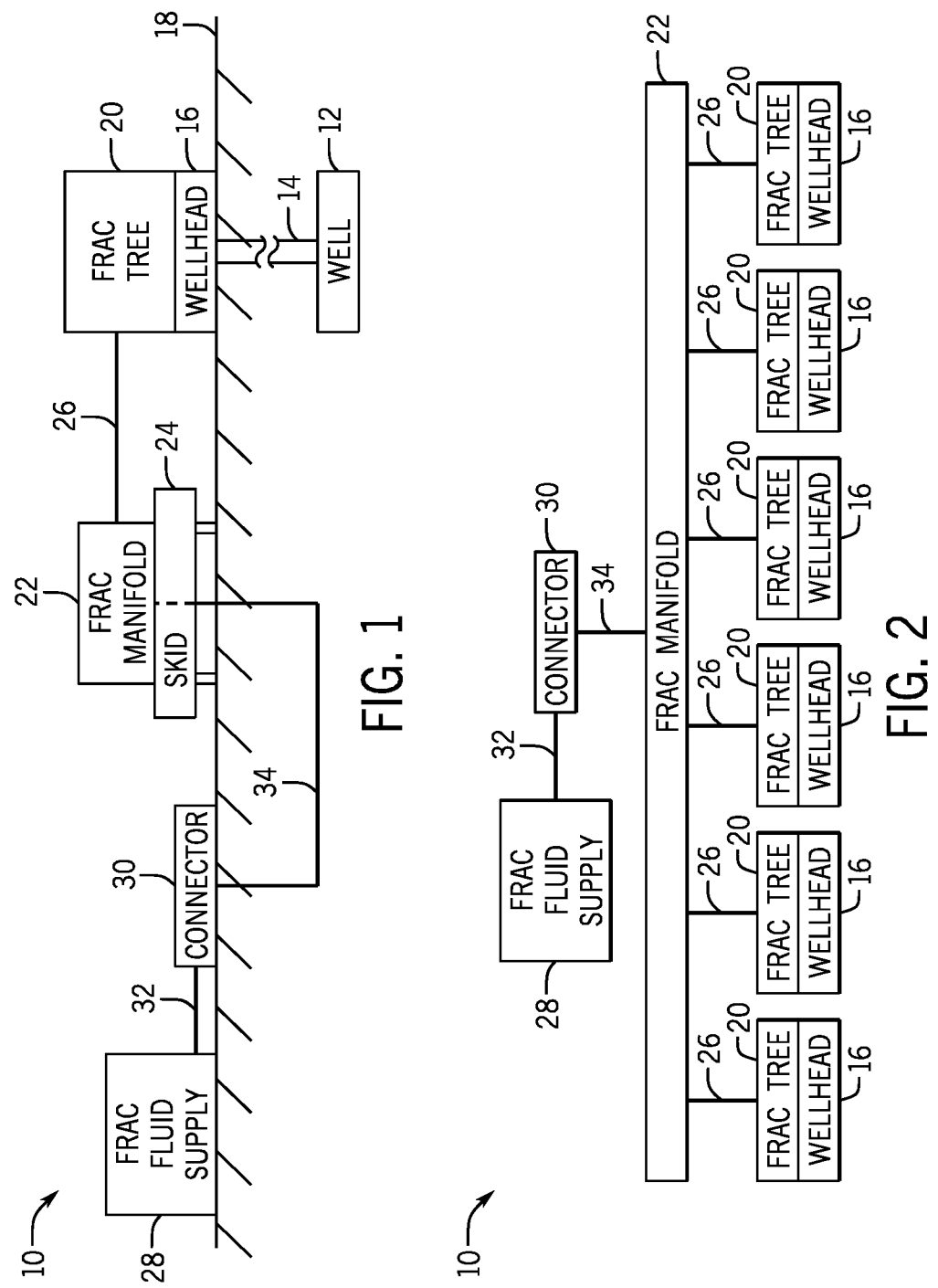
FIG. 1 generally depicts a fracturing system in accordance with an embodiment of the present disclosure.
FIG. 2 is a diagram of the fracturing system of FIG. 1 with a fracturing manifold coupled to multiple fracturing trees in accordance with one embodiment.

Turning now to the present figures, an example of a fracturing system 10 is provided in FIGS. 1 and 2 in accordance with one embodiment. The fracturing system 10 facilitates extraction of natural resources, such as oil or natural gas, from a well 12 via a wellbore 14 and a wellhead 16. Particularly, by injecting a fracturing fluid into the well 12, the fracturing system 10 increases the number or size of fractures in a rock formation or strata to enhance recovery of natural resources present in the formation. In the presently illustrated embodiment, the well 12 is a surface well accessed by equipment of wellhead 16 installed at surface level (i.e., on ground 18). But it will be appreciated that natural resources may be extracted from other wells, such as platform or subsea wells.

The fracturing system 10 includes various components to control flow of a fracturing fluid into the well 12. For instance, the depicted fracturing system 10 includes a fracturing tree 20 and a fracturing manifold 22. In at least some embodiments, the fracturing tree 20 includes at least one valve that controls flow of the fracturing fluid into the wellhead 16 and, subsequently, into the well 12. Similarly, the fracturing manifold 22 may include at least one valve that controls flow of the fracturing fluid to the fracturing tree 20 by a conduit or fluid connection 26, such as one or more pipes.

The fracturing manifold 22 is mounted on at least one skid 24 (e.g., a platform mounted on rails) to facilitate movement of the fracturing manifold 22 with respect to the ground 18. As depicted in FIG. 2, the fracturing manifold 22 is connected to provide fracturing fluid to multiple fracturing trees 20 and wellheads 16. But it is noted that the fracturing manifold 22 may instead be coupled to a single fracturing tree 20 in full accordance with the present techniques. In one embodiment in which the fracturing manifold 22 is coupled to multiple fracturing trees 20, various valves of the fracturing manifold 22 may be mounted on separate skids 24 to enable variation in the spacing between the valves.

Fracturing fluid from a supply 28 is provided to the fracturing manifold 22. In FIG. 1, a connector 30 receives fracturing fluid from the supply 28 through a conduit or fluid connection 32, such as pipes or hoses, and then transmits the fluid to the fracturing manifold 22 by way of a subterranean conduit or fluid connection 34. The fracturing fluid could be routed from the supply 28 to the fracturing manifold 22 entirely above ground without use of a subterranean conduit 34 in other instances. In one embodiment, the fracturing fluid supply 28 is provided by one or more trucks that deliver the fracturing fluid, connect to the connector 30, and pump the fluid into the fracturing manifold 22 via the connector 30 and connections 32 and 34. In another embodiment, the fracturing fluid supply 28 is in the form of a reservoir from which fluid may be pumped into the fracturing manifold 22. But any other suitable sources of fracturing fluid and manners of transmitting such fluid to the fracturing manifold may instead be used.

Figure 3:
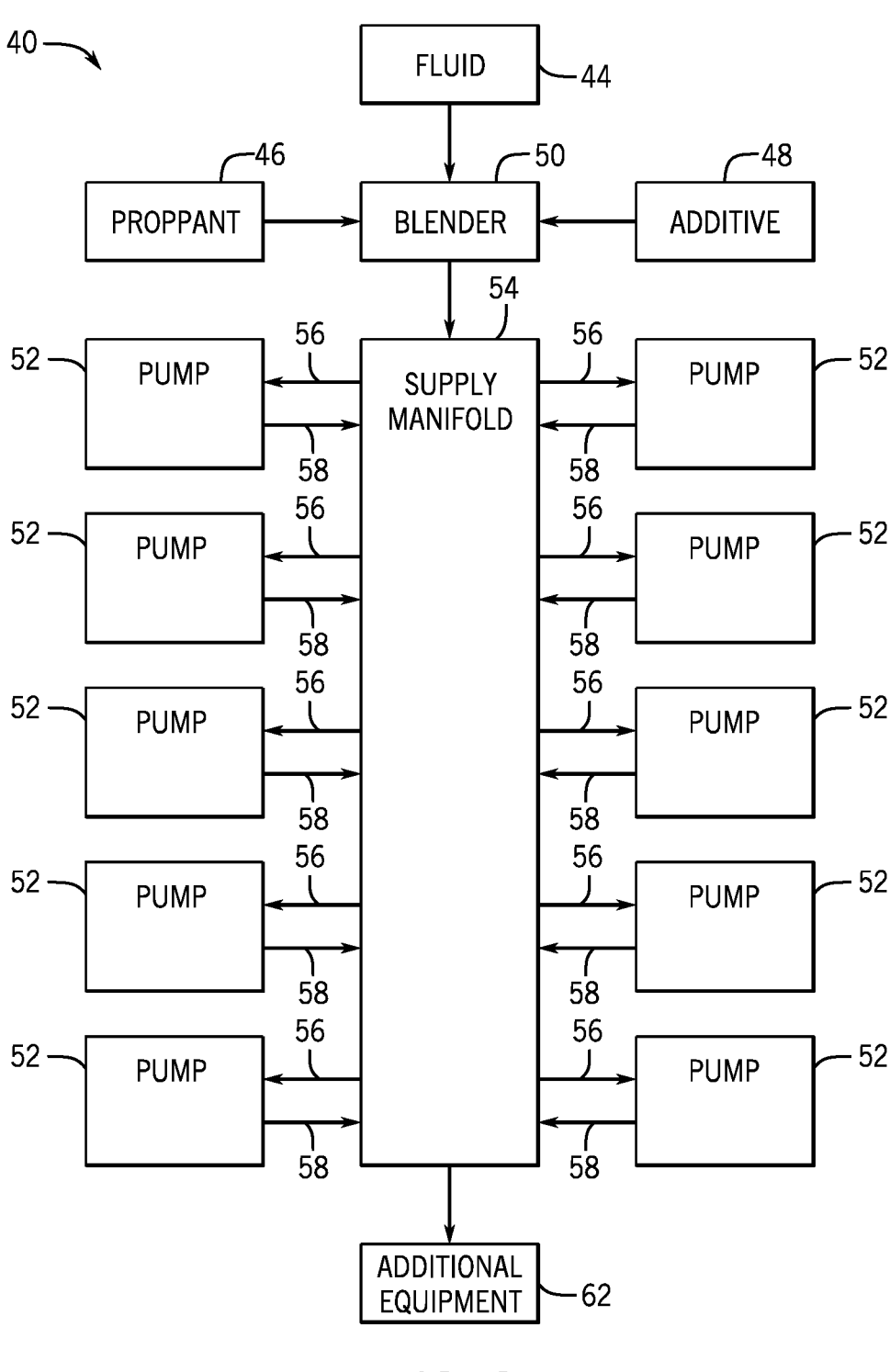
FIG. 3 is a block diagram of a portion of a frac spread having frac pumps connected to a frac supply manifold in accordance with one embodiment.

In some embodiments, the frac fluid supply 28 and connector 30 are embodied by a frac spread with surface fracturing equipment that includes frac pumps connected to a frac supply manifold. One example of such a frac spread is generally depicted in FIG. 3. The depicted frac spread 40 includes a blender 50 for producing fracturing fluid by mixing a fluid 44 (e.g., water) with proppant 46 (e.g., sand) and additive 48 (e.g., a chemical additive). Frac pumps 52, which may be mounted on trucks, are used to increase the pressure of the fracturing fluid received from the blender 50 to an appropriate pressure for fracturing a well 12. In some instances, the fracturing pressure may be 10,000-15,000 psi (approximately 70,000-100,000 kPa).

A frac supply manifold 54 (e.g., a frac missile trailer or skid-based frac missile) may be used to route fluid to and from the pumps 52. For instance, the supply manifold 54 can route low-pressure fracturing fluid from the blender 50 to the pumps 52 for pressurization. High-pressure fracturing fluid from the pumps 52 may be returned to the supply manifold 54 and then routed into a well 12 through additional equipment 62, such as a fracturing tree and a wellhead. In some instances, the additional equipment 62 may include an additional frac manifold (e.g., frac manifold 22) to distribute fracturing fluid to multiple wells 12.

As shown in FIG. 3, low-pressure fracturing fluid can be routed from the supply manifold 54 to the pumps 52 through fluid conduits 56, and high-pressure fracturing fluid can be routed from the pumps 52 to the supply manifold 54 through fluid conduits 58. That is, in the depicted embodiment the fluid conduits 56 are suction lines providing fracturing fluid to the pumps 52 from the supply manifold 54, and the fluid conduits 58 are discharge lines providing fracturing fluid (e.g., at fracturing pressure) from the pumps 52 to the supply manifold 54. In some embodiments the fluid conduits 56 and 58 are flexible conduits, such as hoses or other flexible lines.

Figures 4, 5:
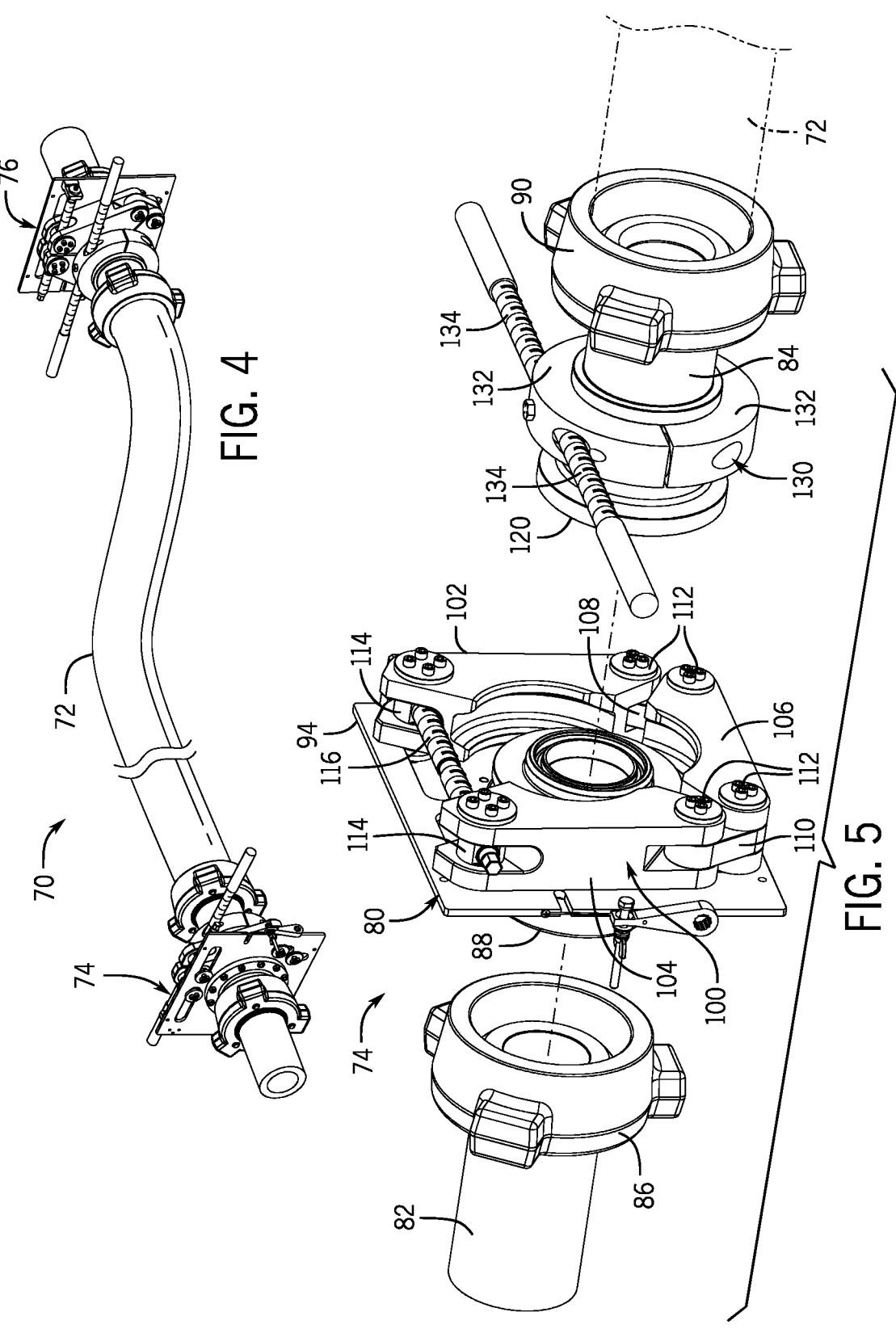
FIG. 4 is a perspective view of a fluid conduit assembly that can be used to connect a frac pump to the frac supply manifold in accordance with one embodiment.
FIG. 5 is an exploded view of a quick connect apparatus of the fluid conduit assembly of FIG. 4, which can be used to connect a fluid conduit to a frac pump, frac supply manifold, or other equipment, in accordance with one embodiment.

One example of a fluid conduit assembly 70 that can be used to connect two components in fluid communication is shown in FIG. 4. In this depicted embodiment, the fluid conduit assembly 70 includes a fluid conduit 72. In some instances, the fluid conduit 72 is a flexible fracturing fluid conduit used as a discharge line 58 or a suction line 56 coupling a frac pump 52 in fluid communication with the frac supply manifold 54, such as shown in FIG. 3. The flexible fluid conduit 72 illustrated in FIG. 4 has a flexible body (e.g., a polymeric body) with a bore for conveying fluid. The flexible body facilitates positioning and installation of the fluid conduit 72 between two components (e.g., a pump 52 and the supply manifold 54). In at least some embodiments, the fluid conduit 72 is a flexible fracturing fluid conduit rated for use at a fracturing pressure, such as rated for a maximum operating pressure that is 10,000-15,000 psi.

The flexible fluid conduit 72 can also have rigid ends to facilitate connection in at least some instances. In some embodiments, the quick connect apparatus 74 is attached to the frac supply manifold 54 and the quick connect apparatus 76 is attached to a frac pump 52, which allows the flexible conduit 72 to be efficiently connected to each of the manifold 54 and the pump 52 via a respective quick connect apparatus 74 or 76. But it should be appreciated that the quick connect apparatuses 74 and 76 could be used to connect the flexible conduit 72 to other equipment instead of, or in addition to, the supply manifold 54 and the pump 52. And in some other instances a quick connect apparatus 74 or 76 can be used to connect one end of the flexible conduit 72 (e.g., to the manifold 54 or the pump 52), while the other end of the flexible conduit 72 can be connected in some other manner (i.e., without the quick connect apparatus 74 or 76).

The quick connect apparatus 74 is depicted in greater detail in FIGS. 5-8 in accordance with one embodiment. In at least some instances, the quick connect apparatus 76 is identical to the quick connect apparatus 74 and operates in the same manner described herein. The quick connect apparatus 74 includes a clamp assembly 80 for joining connection members 82 and 84. In some cases, the connection members 82 and 84 are adapters to facilitate connection of the fluid conduit 72 to other equipment via the clamp assembly 80. The connection member 82 is a discharge pipe of a frac pump 52 or an inlet pipe of a frac supply manifold 54 in some embodiments. The clamp assembly 80 can be mounted on a frac pump 52 or the frac supply manifold 54 either directly or via an adapter. In the embodiment shown in FIG. 5, a hammer union 86 is used to connect the connection member 82 to a hub 88 of the clamp assembly 80. In other instances, the connection member 82 can be connected to the hub 88 in some other manner. A hammer union 90 can also be used to join the fluid conduit 72 to the connection member 84, as shown in FIG. 5, or the fluid conduit 72 can be joined to the connection member 84 in any other suitable manner.

The clamp assembly 80 of FIG. 5 includes a support plate 94 (e.g., a plate of a shared support) connected to the hub 88. A segmented clamp 100 is mounted on the support plate 94 to facilitate quick connection of the fluid conduit 72 to other equipment, such as a frac pump 52 or the frac manifold 54. The segmented clamp 100 can have any suitable number of clamp segments but is depicted in FIG. 5 as having three clamp segments: segment 102, segment 104, and segment 106. The clamp 100 is shown in FIG. 5 as including a link 108, which joins the segment 102 to the segment 106, and a link 110, which joins the segment 104 to the segment 106. The links 108 and 110 are shown received in end slots (which may be also referred to as clevis slots) of the clamp segments and secured with pins 112, which allow the joined links 108 and 110 to pivot with respect to the attached segments 102, 104, and 106.

The segmented clamp 100 of FIG. 5 also includes trunnions 114 and a threaded fastener 116 that cooperate to move the clamp 100 between locked and unlocked positions. The threaded fastener 116 is depicted as a leadscrew in FIG. 5 but could take different forms (e.g., a bolt or cap screw) in other embodiments. The threaded fastener 116 is connected across the clamp segments 102 and 104 and threaded into the trunnions 114 installed in end slots of the segments 102 and 104. Like the links 108 and 110, the trunnions 114 can pivot with respect to the segments 102 and 104 to facilitate movement of the clamp 100 between its locked and unlocked positions.

In some embodiments, including that depicted in FIG. 5, the threaded fastener 116 is a leadscrew with twin leads— that is, with one end of the leadscrew threaded in one direction (e.g., a right-handed thread pattern) and the other end of the leadscrew threaded in the opposite direction (e.g., a left-handed thread pattern). Rotation of the leadscrew in one direction draws (via threaded engagement with the trunnions 114) the clamp segments 102 and 104 toward one another along the leadscrew, while rotation of the leadscrew in the opposite direction moves the clamp segments 102 and 104 apart along the leadscrew. Although multiple threaded fasteners 116 could be used to open and close the clamp 100 in other instances, in some embodiments a single threaded fastener 116 is used to open and close the clamp 100.

Figure 6:
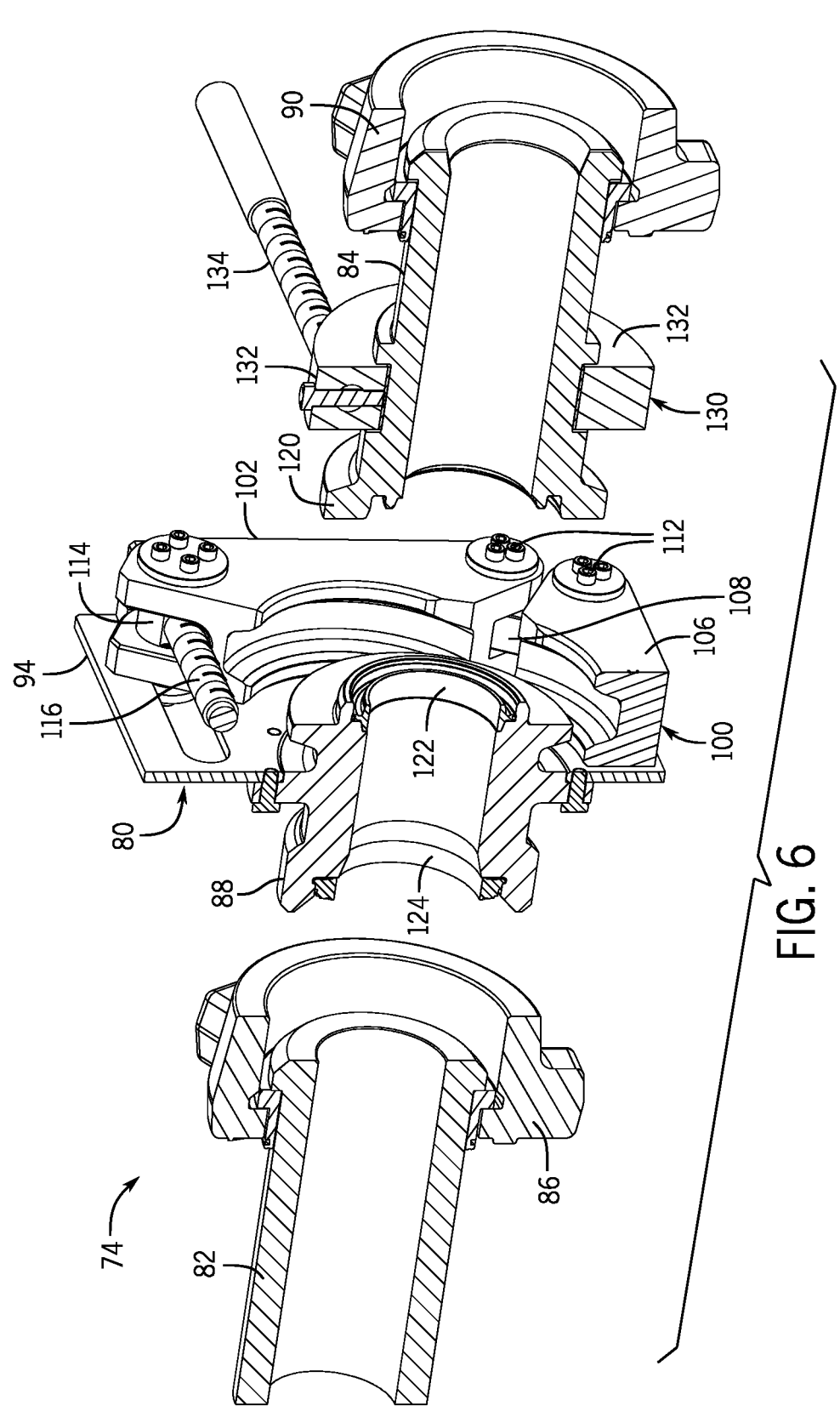
FIG. 6 is a section view of the quick connect apparatus of FIG. 5 in accordance with one embodiment.

Various gaskets or other seals may be used to prevent leakage of fluid at interfaces of the connection members 82 and 84 with the hub 88. As shown in FIG. 6, for example, a gasket 122 is used to seal an interface between the connection member 82 and the hub 88, and a gasket 124 is used to seal an interface between the connection member 82 and the hub 88. In at least some instances, the gasket 122 is a metal gasket providing a metal-to-metal seal against the hub 88 and the connection member 82, and the gasket 124 is an elastomer gasket sealing against the hub 88 and the connection member 82. Tightening of the clamp 100 onto the end of the fluid conduit 72 (e.g., on an end 120 of the connection member 84) sets the gasket 122 in at least some embodiments. The hub 88 and connection members 82 and 84 can include spigots and noses for final alignment features for mating and avoiding damage to the gaskets 122 and 124 and sealing surfaces. In at least some instances, the quick connect system allows the end of the fluid conduit 72 (e.g., the connection member 84) to rotate during make-up to accommodate torsional stiffness of the fluid conduit 72 and minimize damage to the fluid conduit 72. The gasket 122 and quick connect system may have backseat testing capability to avoid hydro testing of the bore. It can also include features to be used for different pumps and hose heads (e.g., different connection members 82 or 84), making it a versatile connection system. And in some embodiments, the apparatus may be instrumented with one or more sensors to detect leakage at the gasket 122 or 124.

Figure 7:
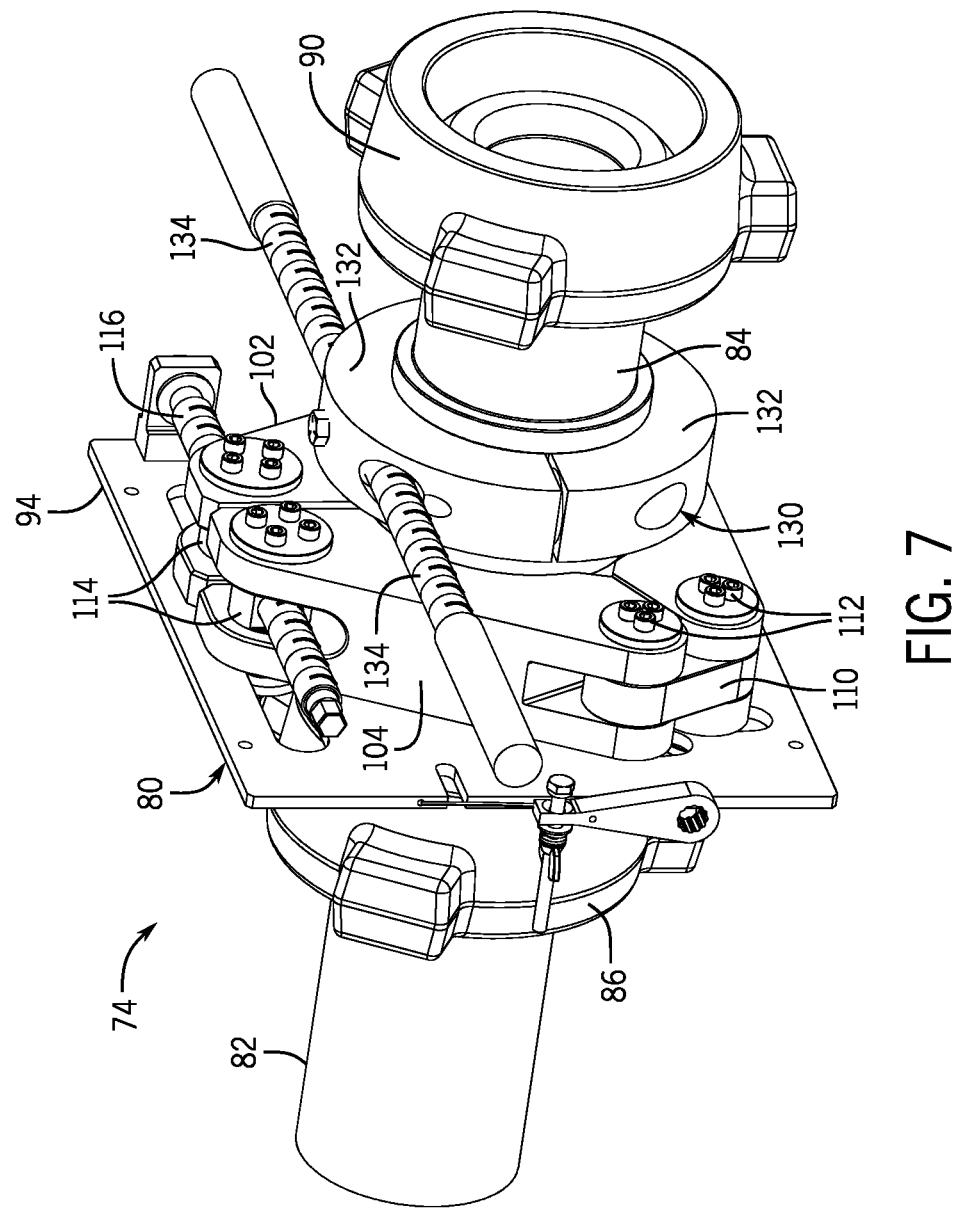
FIG. 7 is a perspective view of the quick connect apparatus of FIG. 5 in accordance with one embodiment.
Figure 9:
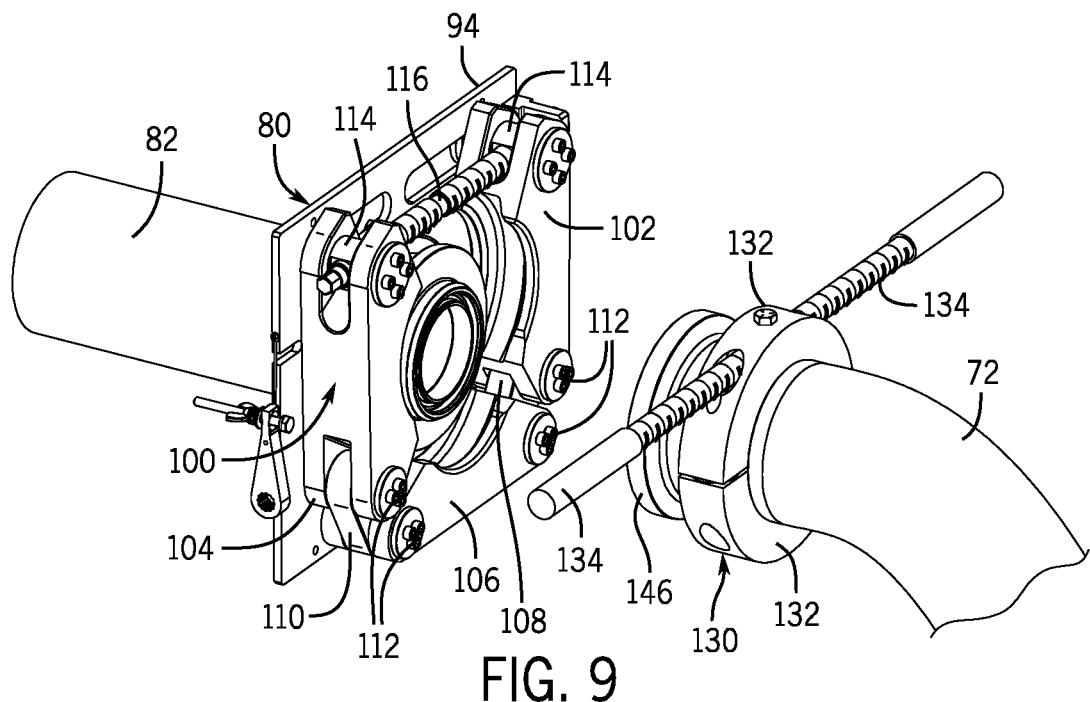
FIG. 9 shows a quick connect apparatus in accordance with one embodiment.

The clamp 100 is depicted in an unlocked (i.e., open) position in FIGS. 5 and 6. With the clamp 100 in the unlocked position, the end 120 of the connection member 84 can be moved into end-to-end alignment with the hub 88 radially inward of the clamp 100, such as shown in FIG. 7. In some instances, a handling ring 130 is coupled to the fluid conduit 72. In FIGS. 5-7, the handling ring 130 is coupled to the fluid conduit 72 via the connection member 84 attached to the end of the fluid conduit 72. The handling ring 130 may take any suitable form, but in FIGS. 5-7 the handling ring 130 is shown as a split ring having two ring segments 132 fastened together (e.g., with bolts). The handling ring 130 can include a handle 134 to facilitate handling by field personnel during installation. In FIGS. 5-7, the handling ring 130 is shown having two handles 134 threaded to the handling ring 130. In other instances, however, the handling ring 130 can include any suitable number of handles 134 (which could be a single handle 134) and these handles 134 can have any suitable design. The handles 134 may be used by field personnel to move the connection member 84 toward or away from the clamp 100, and into or out of alignment with the hub 88, during connection or disconnection of the fluid conduit 72 to or from the clamp assembly 80. In another embodiment, as depicted in FIG. 9, the connection member 84 is omitted, the fluid conduit 72 is shown with an end 146 to be secured by the clamp assembly 80, and the handling ring 130 is mounted on the fluid conduit 72 to facilitate handling by field personnel during connection or disconnection of the fluid conduit 72 to or from the clamp assembly 80.

With the end 120 of the connection member 84 positioned in end-to-end alignment with the hub 88, the threaded fastener 116 can be rotated to draw ends of the segments 102 and 104 toward one another to move the clamp 100 into the locked (i.e., closed) position, as shown in FIG. 7. More specifically, in at least some embodiments, the clamp 100 contracts around the end 120 of the connection member 84 and the adjacent end of the hub 88 as the clamp 100 is closed via the threaded fastener 116.

Figure 8:
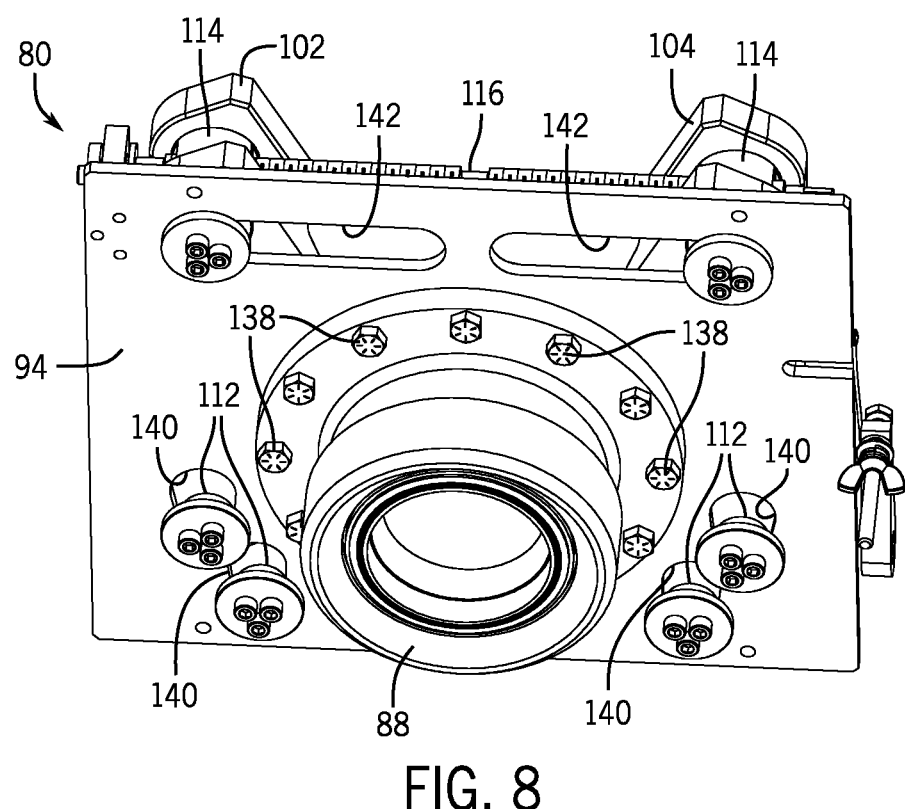
FIG. 8 is a rear perspective view of a clamp assembly of the quick connect apparatus of FIG. 5 in accordance with one embodiment.

This operation may be better understood with reference to FIG. 8, which depicts a rear (inboard) end of the clamp assembly 80. Although the hub 88 is shown connected to the plate 94 with fasteners 138, the hub 88 could be connected to the plate 94 in some other manner. In this embodiment, the segments 102, 104, and 106 are mounted on the shared plate 94 via the pins 112 and trunnions 114. The pins 112 extend through slots 140 in the plate 94, while the trunnions 114 extend through slots 142. As the clamp 100 is tightened via the threaded fastener 116, the trunnions 114 move toward one another along the threaded fastener 116 and within the slots 142, while the pins 112 move within the slots 140 to facilitate contraction of the clamp 100 into securing engagement with the end 120 of the connection member 84 and the adjacent end of the hub 88. To open the clamp 100, the threaded fastener 116 may be rotated in an opposite direction to push the trunnions 114 apart along the threaded fastener 116 and within the slots 142, with the pins 112 moving within the slots 140 to allow expansion of the clamp 100 and release of the end 120 from the clamping assembly 80.

Figure 10:
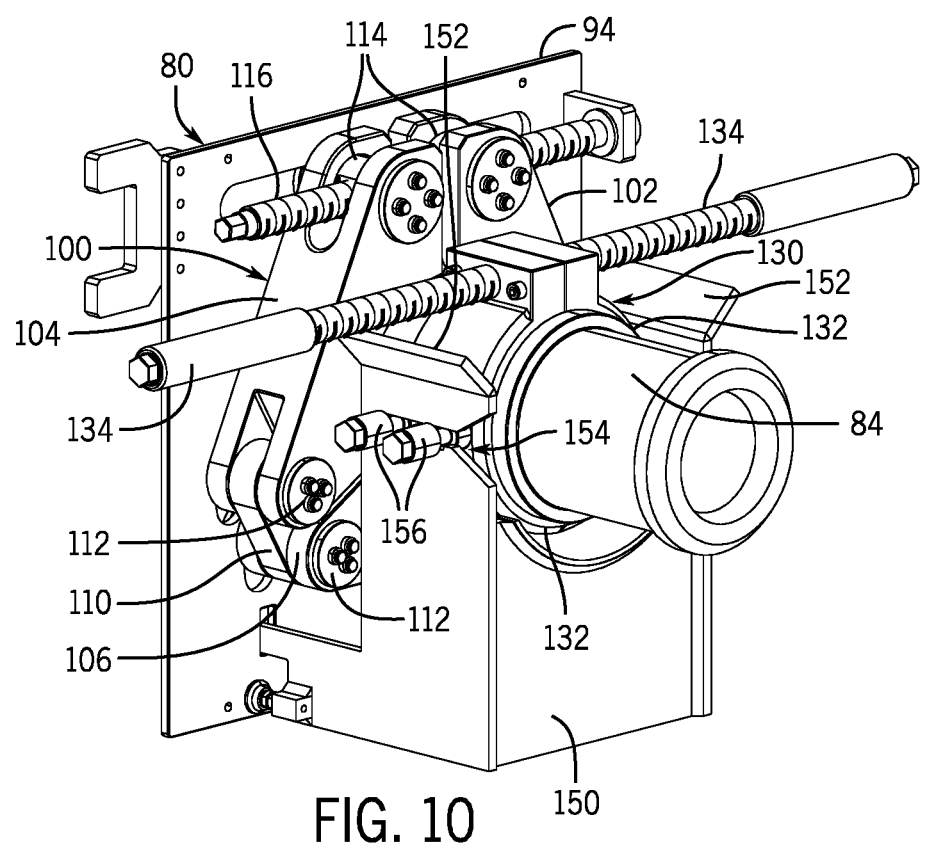
FIGS. 10-13 show a quick connect apparatus having a landing porch and alignment features in accordance with one embodiment.
Figure 11:
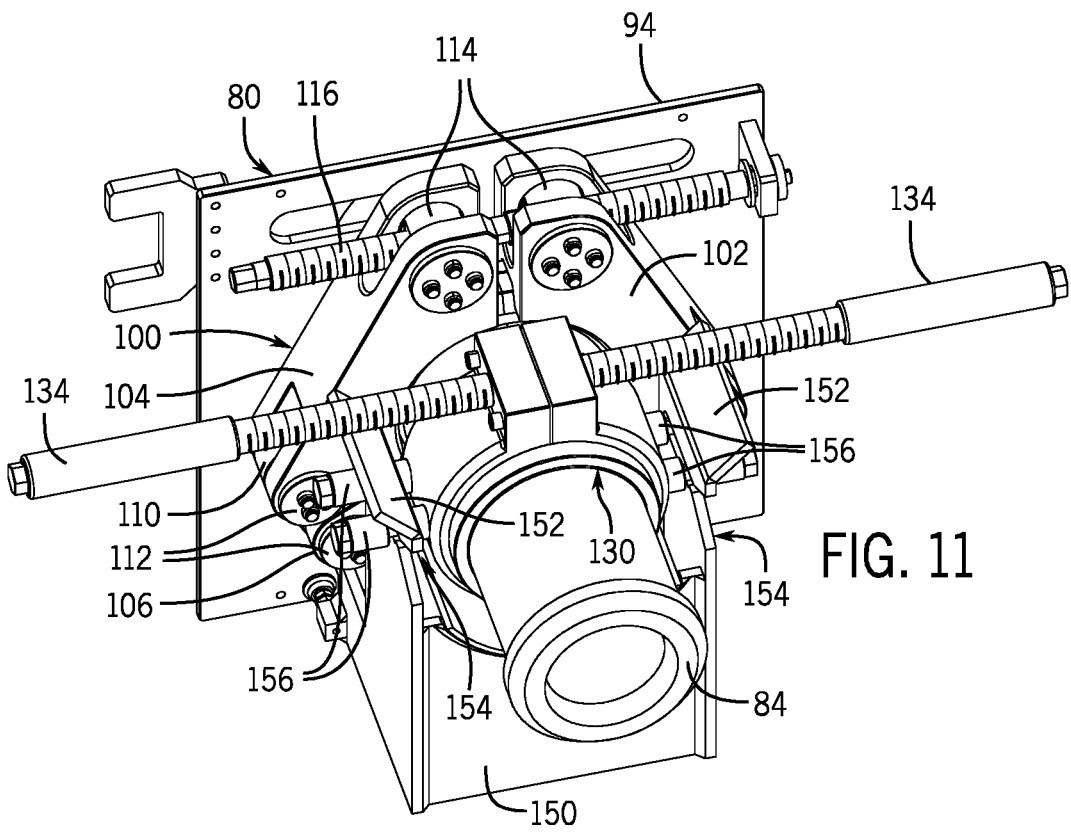

In some embodiments, the quick connect apparatuses 74 and 76 include a landing porch for receiving an end of the fluid conduit 72 and facilitating tie-in to surface fracturing equipment. By way of example, the clamp assembly 80 is depicted in FIGS. 10 and 11 with a landing porch 150 having various alignment features. During tie-in, an end of the fluid conduit 72 (e.g., the end 146, or the end 120 of the connection member 84) can be landed on the landing porch 150, which includes flared ends 152 for guiding the end of the fluid conduit 72 into rough alignment with the clamp 100 (as well as with hub 88 and connection member 82) as the end is lowered onto the landing porch 150. The end of the fluid conduit 72 can be landed onto the landing porch 150 in any suitable manner, such as by manually lifting the end of the fluid conduit 72 and setting it down onto the landing porch 150 or by using a forklift or other machine to lower the end of the fluid conduit 72 onto the landing porch 150.

Figure 12:
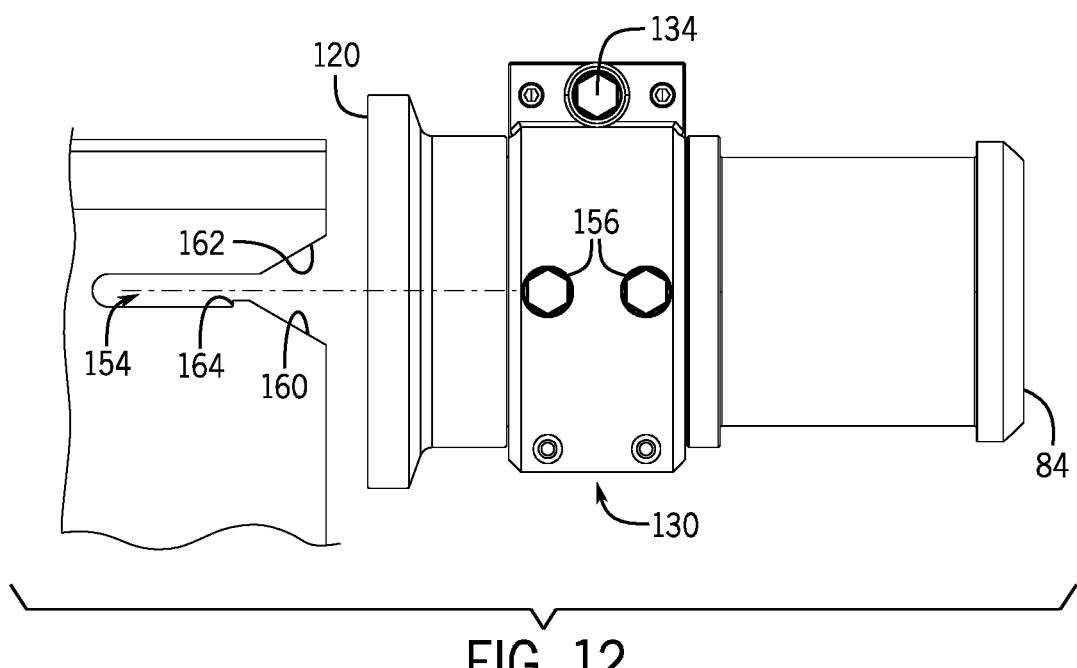

The depicted landing porch 150 also includes alignment slots 154 for receiving alignment pins 156 (e.g., protrusions) coupled to the fluid conduit 72. In FIGS. 10 and 11 these alignment pins 156 are shown attached to the handling ring 130, but the alignment pins 156 could be provided elsewhere on the fluid conduit 72. In other instances, the alignment pins 156 could be provided on the landing porch 150 and the alignment slots 154 could be provided on the handling ring 130 or elsewhere along the fluid conduit 72. The alignment slots 154 and pins 156 facilitate further alignment of the end of the fluid conduit 72 with the clamp assembly 80. As best shown in FIG. 12, the alignment slot 154 on each side of the landing porch 150 includes angled entry surfaces 160 and 162 to guide entry of the alignment pins 156 into the slot 154 as the end of the fluid conduit 72 is moved into position within the clamp 100.

Although any suitable number of alignment pins 156 may be used, the presently depicted embodiment includes four alignment pins 156 arranged in pairs on opposite sides of the fluid conduit 72 such that two pins 156 are received in each slot 154. During tie-in, receipt of the leading alignment pins

Figure 13:
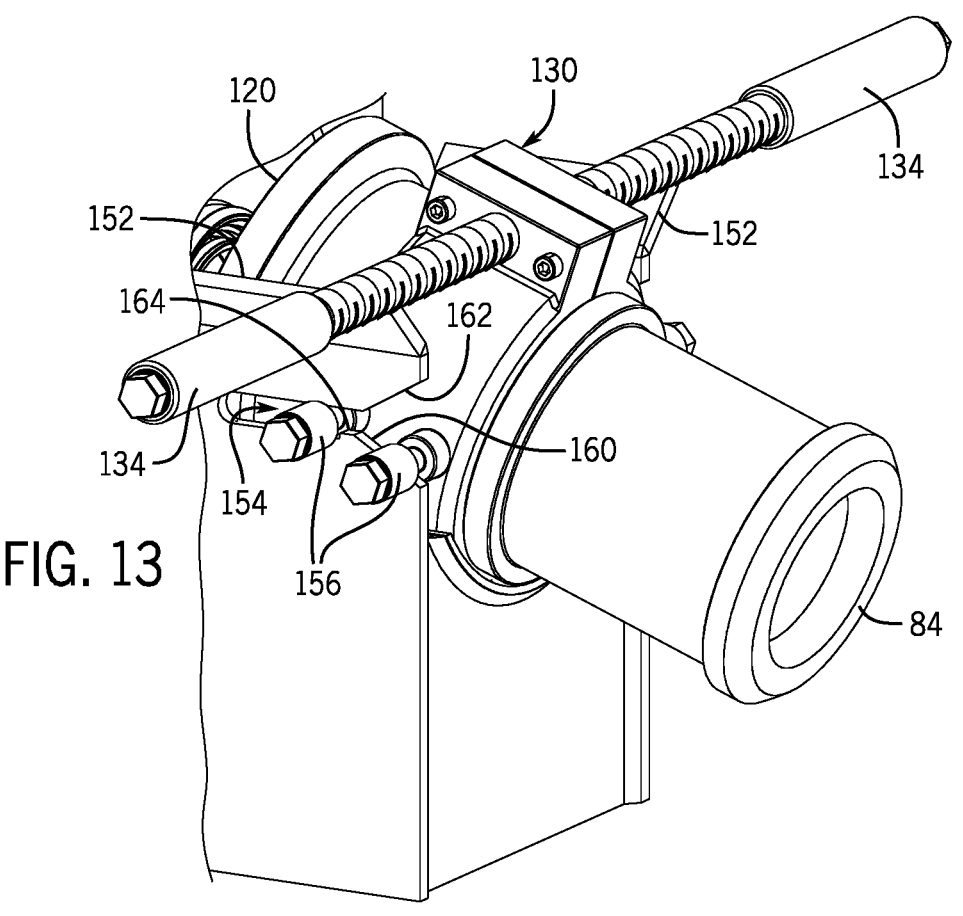

156 (i.e., the two pins 156 closer to the end of the fluid conduit 72 to be secured via the clamp 100) in the slots 154 provides rough alignment and yaw correction (e.g., via receipt of slot surfaces in corresponding grooves of the alignment pins 156) of the fluid conduit 72 with respect to the clamping assembly 80. As shown in FIG. 13, with the leading alignment pins 156 inserted into the slots 154 past ridges 164 of the slots, the trailing alignment pins 156 may be at a different elevation than the leading alignment pins 156, such that the pitch of the fluid conduit end is not aligned with the clamp assembly 80. But as the fluid conduit end is further moved toward the clamp 100, the angled surfaces 160 or 162 can guide the trailing alignment pins 156 and correct the pitch of the fluid conduit end into alignment with the clamp assembly 80 (e.g., coaxial with the hub 88). When both pairs of alignment pins 156 are received in the slots 154, the ridges 164 may prevent inadvertent movement of the pins 156 away from the plate 94 so as to retain the end of the fluid conduit in position to be engaged by clamp 100.

Figure 14:
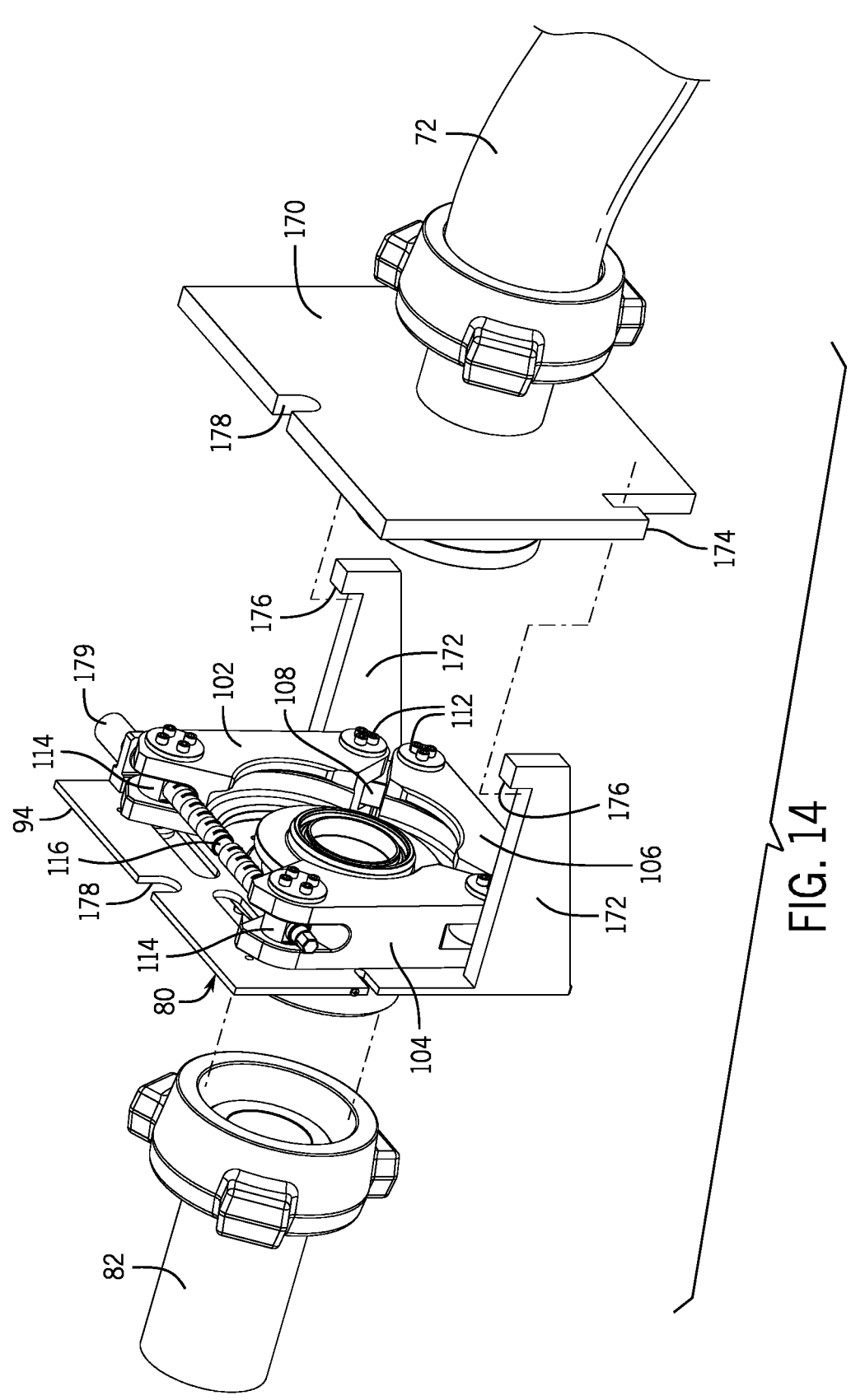
FIGS. 14-16 show a quick connect apparatus that can be made up in an automated manner with actuators in accordance with one embodiment.

In some embodiments, make-up of the fluid conduit 72 to the quick connect apparatus may be remotely actuatable. In an embodiment illustrated in FIGS. 14-16, for instance, the end of the fluid conduit 72 includes a plate 170 configured to interface with a landing porch, which is shown as two rails 172 extending outward from the plate 94 of the clamp assembly 80. In this depicted embodiment, the plate 170 includes grooves 174 for receiving the rails 172 when the plate 170 is landed on the rails 172. Stops 176 at the ends of the rails 172 are provided to prevent the plate 170 from sliding off the upper landing surfaces when landed on the rails 172. As shown in FIG. 14, the rails 172 have upper surfaces perpendicular to the plate 94. In other embodiments, the rails 172 have angled upper surfaces for guiding the plate 170 upward into alignment with the clamp 100 during make-up. The upper surface of each rail 172 may be angled by any suitable amount, but in one embodiment the upper landing surface of each rail 172 is provided at an angle of thirty degrees.

Figures 15, 16:
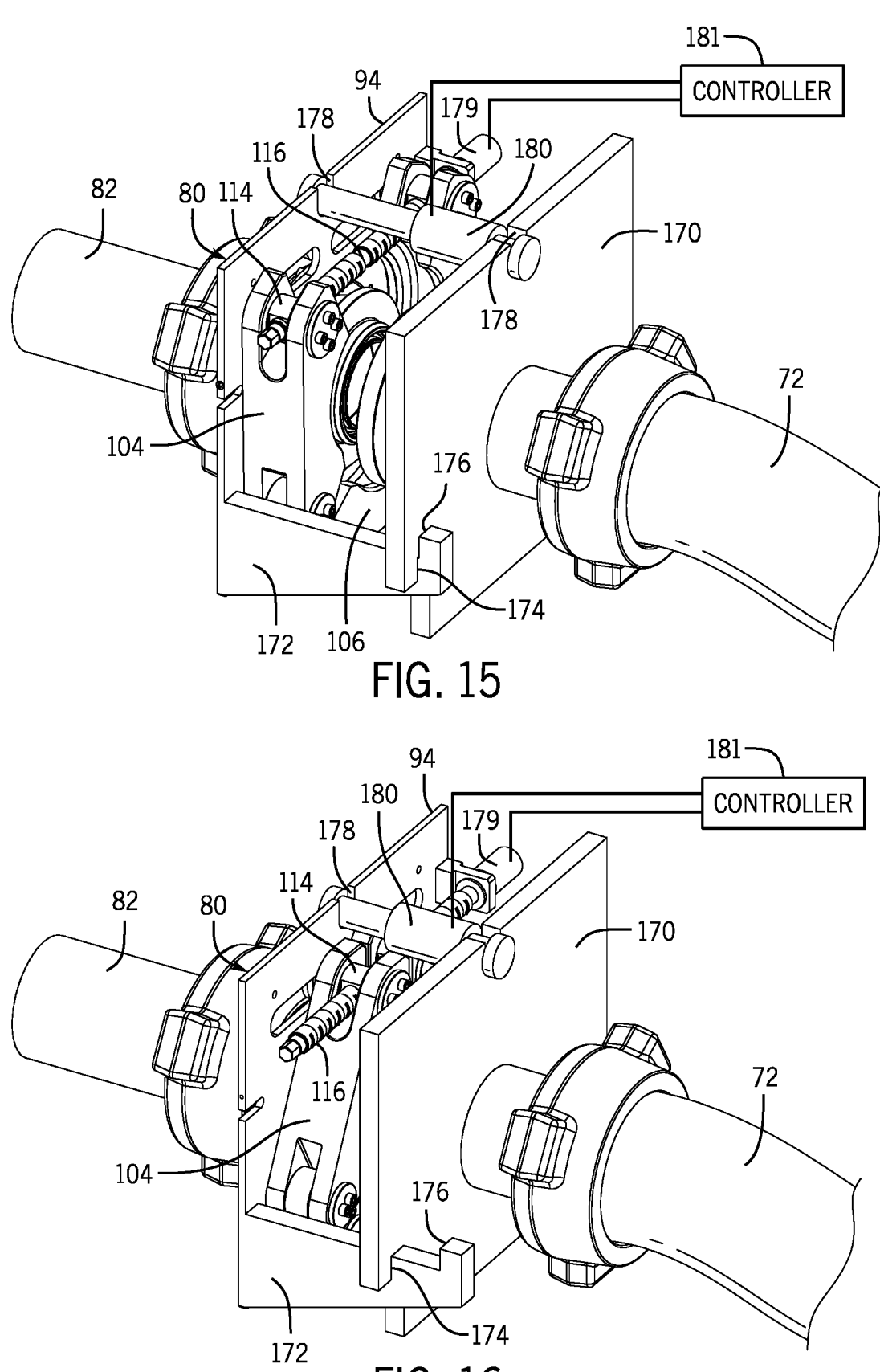

During installation, the plate 170 of the fluid conduit 72 can be landed on the rails 172 as shown in FIG. 15. A stroking tool 180 can be connected across the plates 94 and 170, such as by landing opposing ends of the stroking tool 180 in interface slots 178 of the plates 94 and 170. The stroking tool 180 can then be actuated to draw the plate 170 along the rails 172 toward the plate 94 to position the fluid conduit end radially within the clamp 100 (and in alignment with the hub 88), such as shown in FIG. 16. The stroking tool 180 can make and preload the connection (e.g., between the hub 88 and the mating end of the fluid conduit 72) to overcome any external loading, such as bore pressure, bending load, or tension load.

The threaded fastener 116 may then be rotated to move the clamp 100 to its locked position and secure the fluid conduit 72 with the clamp 100. In some embodiments, rotation of the threaded fastener 116 is driven with an actuator 179, such as a hydraulic motor, an electric motor, or a pneumatic motor. Likewise, the stroking tool 180 can be a hydraulic stroking tool (e.g., a hydraulic cylinder), an electric stroking tool (e.g., a mechanical bolted stroking device with an electric actuator), or a pneumatic stroking tool.

In at least some embodiments, after the fluid conduit 72 is landed on the landing porch (e.g., with the plate 170 on rails 172), make-up of the fluid conduit 72 to the clamp assembly 80 is then performed in an automated manner via a controller 181 without further human handling of the fluid conduit 72 or manual closing of the clamp 100. For instance, the controller 181 can control operation of the stroking tool 180 to draw the fluid conduit 72 into position within the clamp 100 and can control operation of the actuator 179 to close or open the clamp 100. The controller 181 can be provided in any suitable form, such as a remote control with physical or virtual buttons or switches that allow an operator to command operation of the stroking tool 180 and the actuator 179. In some instances, a separate controller 181 could be used for each of these functions. These automated actions can be performed remotely in some instances, such as from a remote control-center location, using wireless or traditional hose/wired technologies.

Figure 17:
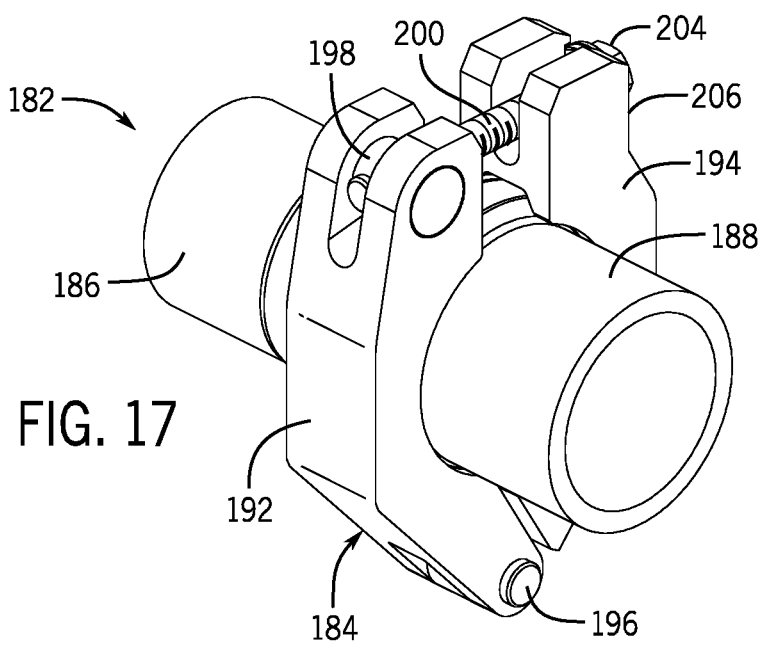
FIGS. 17 and 18 depict a quick connect apparatus having a two-segment clamp in accordance with one embodiment.
Figure 18:
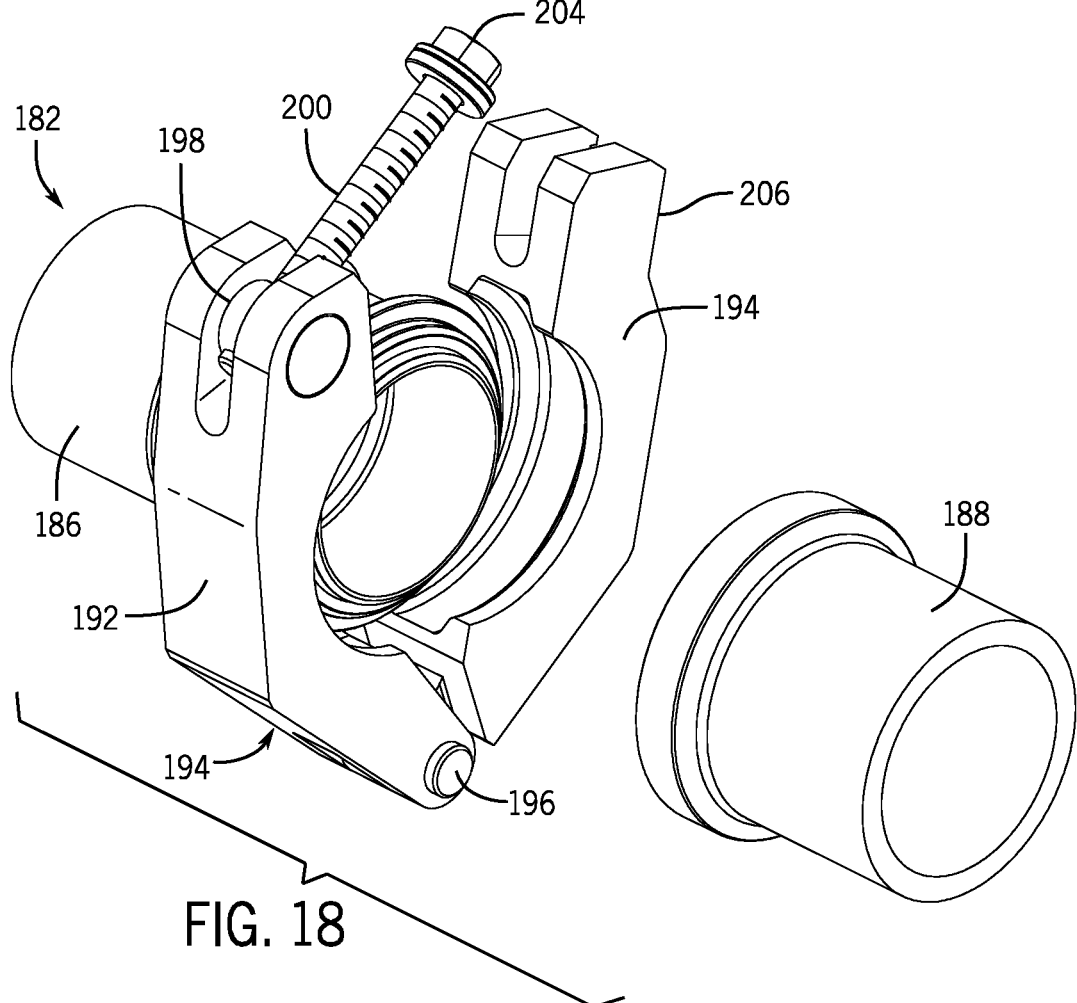

The connection systems described above may be used for both low-pressure lines (e.g., suction lines 56) and high-pressure lines (e.g., discharge lines 58). But in some instances, a different connection system could be used for low-pressure lines. One example of such a connection system is depicted in FIGS. 17 and 18. In this embodiment, a clamp assembly 182 includes a clamp 184 for securely joining connection members 186 and 188, which may be analogous to the connection members 82 and 84 described above. The clamp 184 is depicted as a two-segment clamp, with clamp segments 192 and 194 connected with a pin 196 (e.g., a clevis pin) that allows the segments 192 and 194 to be moved together or apart about the pin 196. The clamp 184 includes an actuation mechanism having a single threaded fastener 200 connected to a trunnion 198. As depicted in FIGS. 17 and 18, the threaded fastener 200 is a bolt threaded into the trunnion 198. The threaded fastener 200 can be rotated, such as by a head 204, in one direction to tighten the clamp 184 about the connection members 186 and 188 and in an opposite direction to loosen the clamp 184. The threaded fastener 200 is shown to be received in a slot of the clamp segment 194 in FIG. 17. During tightening of the clamp 184, the head 204 pushes the bearing surface 206 of the clamp segment 194 toward the trunnion 198 to draw the ends of the clamp segments 192 and 194 toward one another. When the clamp 184 is loosened, the trunnion 198 may be pivoted to swing the threaded fastener 200 out of the end of the clamp segment 194, as shown in FIG. 18, to allow wider opening of the clamp 184 and facilitate installation or removal. In some instances, a motor or other actuator can be connected to remotely actuate opening and closing of the clamp 184.

The quick connect systems described above can be constructed to allow quick connection of fluid conduits of various sizes. In at least some embodiments, the quick connect systems described above are constructed to connect a fluid conduit having an inner bore diameter of 1.5-3.5 inches, such as a flexible fracturing fluid conduit having a nominal diameter of 2.0 inches, 2.5 inches, 2.7 inches, 2.8 inches, or 3.0 inches. In other instances, quick connect systems described above can be constructed to connect larger lines, such as flexible fracturing lines having an inner bore diameter of 4-8 inches. In at least some embodiments, the flow bore of the hub 88 has a diameter that is equal to that of the fluid conduit to be connected to the hub 88 with the quick connect system.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A fracturing system comprising:
a frac pump;
a frac supply manifold;
a fracturing fluid conduit connected to route fracturing fluid between the frac pump and the frac supply manifold, wherein the fracturing fluid conduit comprises first and second protrusions;
a quick connect apparatus including a segmented clamp having multiple clamp segments mounted on a plate of a shared support, wherein the multiple clamp segments are configured to open and close about an end portion of the fracturing fluid conduit, and the fracturing fluid conduit is connected to the frac pump or to the frac supply manifold via the quick connect apparatus; and
a landing porch coupled to the plate of the shared support, wherein the landing porch and the segmented clamp are disposed on a same side of the plate of the shared support, the landing porch comprises opposite first and second plates spaced apart from one another about a central axis of the segmented clamp, the first plate defines a first slot and the second plate defines a second slot, the first and second slots extend in an axial direction along the central axis of the segmented clamp, the end portion of the fracturing fluid conduit is configured to move between the first and second plates of the landing porch, and the first and second protrusions of the fracturing fluid conduit are configured to move in the axial direction along the first and second slots in the respective first and second plates to guide the end portion of the fracturing fluid conduit into the segmented clamp.

2. The fracturing system of claim 1, wherein the first plate comprises a first flared end that is angled toward the second plate in a downward direction, the second plate comprises a second flared end that is angled toward the first plate in the downward direction, and a spacing between the first and second plates decreases in the downward direction between the first and second flared ends.

3. The fracturing system of claim 2, wherein the first slot is below the first flared end and a first portion of the first plate separates the first slot from the first flared end, and the second slot is below the second flared end and a second portion of the second plate separates the second slot from the second flared end.

4. The fracturing system of claim 1, wherein the shared support of the quick connect apparatus is mounted on the frac supply manifold.

5. The fracturing system of claim 4, wherein the shared support of the quick connect apparatus is mounted on the frac supply manifold via a hammer union connection.

6. The fracturing system of claim 4, comprising a support structure between the first and second plates below the first and second slots, wherein a curved top of the support structure curves downwardly between the opposite plates, and the curved top extends at least half of a distance between the first and second plates.

7. The fracturing system of claim 1, wherein the shared support of the quick connect apparatus is mounted on the frac pump.

8. The fracturing system of claim 1, wherein the segmented clamp includes a threaded fastener configured to move the segmented clamp between a locked position and an unlocked position to facilitate connection of the fracturing fluid conduit to the quick connect apparatus.

9. The fracturing system of claim 8, wherein the threaded fastener includes a leadscrew connected across two clamp segments of the multiple clamp segments such that, during operation, rotation of the leadscrew in one direction draws the two clamp segments toward one another along the leadscrew and rotation of the leadscrew in an opposite direction moves the two clamp segments away from one another along the leadscrew.

10. The fracturing system of claim 1, comprising a stroking tool coupled between the quick connect apparatus and the fracturing fluid conduit to draw the fracturing fluid conduit into engagement with the quick connect apparatus during make-up of the fracturing fluid conduit to the quick connect apparatus.

11. The fracturing system of claim 1, comprising a handling ring coupled to the fracturing fluid conduit, wherein the first and second protrusions are coupled to respective first and second sides of the handling ring, and first and second handles are coupled to the respective first and second sides of the handling ring.

12. The fracturing system of claim 1, wherein the fracturing fluid conduit includes a flexible body having a bore to convey the fracturing fluid.

13. The fracturing system of claim 1, comprising an additional quick connect apparatus including a segmented clamp having multiple clamp segments mounted on a shared support, wherein the fracturing fluid conduit is connected to the frac supply manifold via the quick connect apparatus and is connected to the frac pump via the additional quick connect apparatus.

14. A fracturing system comprising:
a fracturing fluid conduit comprising first and second protrusions;
a quick connect apparatus to connect the fracturing fluid conduit to surface fracturing equipment, the quick connect apparatus including a segmented clamp, wherein the segmented clamp has multiple clamp segments mounted on a plate of a shared support, and the multiple clamp segments are configured to open and close about an end portion of the fracturing fluid conduit; and
a landing porch coupled to the plate of the shared support, wherein the landing porch and the segmented clamp are disposed on a same side of the plate of the shared support, the landing porch comprises opposite first and second plates spaced apart from one another about a central axis of the segmented clamp, the first plate defines a first slot and the second plate defines a second slot, the first and second slots extend in an axial direction along the central axis of the segmented clamp, the end portion of the fracturing fluid conduit is configured to move between the first and second plates of the landing porch, and the first and second protrusions of the fracturing fluid conduit are configured to move in the axial direction along the first and second slots in the respective first and second plates to guide the end portion of the fracturing fluid conduit into the segmented clamp.

15. The fracturing system of claim 14, wherein the first plate comprises a first flared end that is angled toward the second plate in a downward direction, the second plate comprises a second flared end that is angled toward the first plate in the downward direction, and a spacing between the first and second plates decreases in the downward direction between the first and second flared ends.

16. The fracturing system of claim 14, wherein the first protrusion comprises a first pin protruding radially relative to an axis of the fracturing fluid conduit, and the second protrusion comprises a second pin protruding radially relative to the axis of the fracturing fluid conduit.

17. The fracturing system of claim 14, wherein the first protrusion comprises a plurality of first pins configured to move in the axial direction along the first slot in the first plate, the second protrusion comprises a plurality of second pins configured to move in the axial direction along the second slot in the second plate, the plurality of first pins are arranged in series along an axis of the fracturing fluid conduit on a first side of the fracturing fluid conduit, and the plurality of second pins are arranged in series along the axis of the fracturing fluid conduit on an opposite second side of the fracturing fluid conduit.

18. A method comprising:
moving an end portion of a fracturing fluid conduit toward a quick connect apparatus having a segmented clamp mounted on a support plate of a shared support, wherein the fracturing fluid conduit comprises first and second protrusions;
moving the end portion of the fracturing fluid conduit between first and second plates of a landing porch coupled to the support plate of the shared support, wherein the landing porch and the segmented clamp are disposed on a same side of the support plate of the shared support, the first and second plates are spaced apart from one another about a central axis of the segmented clamp, the first plate defines a first slot and the second plate defines a second slot, and the first and second slots extend in an axial direction along the central axis of the segmented clamp;
moving the first and second protrusions of the fracturing fluid conduit in the axial direction along the first and second slots in the respective first and second plates to guide the end portion of the fracturing fluid conduit into the segmented clamp; and
securing the end portion of the fracturing fluid conduit to surface fracturing equipment via the quick connect apparatus, wherein securing the end portion of the fracturing fluid conduit to surface fracturing equipment via the quick connect apparatus includes rotating an externally threaded fastener to close the segmented clamp about the end portion of the fracturing fluid conduit.

19. The method of claim 18, wherein the first plate comprises a first flared end that is angled toward the second plate in a downward direction, the second plate comprises a second flared end that is angled toward the first plate in the downward direction, and a spacing between the first and second plates decreases in the downward direction between the first and second flared ends.

20. The method of claim 18, wherein moving the end portion of the fracturing fluid conduit toward the quick connect apparatus includes actuating a stroking tool to move the end portion of the fracturing fluid conduit toward the quick connect apparatus, and rotating the externally threaded fastener to close the segmented clamp about the end portion of the fracturing fluid conduit includes using an actuator to rotate the externally threaded fastener to close the segmented clamp about the end portion of the fracturing fluid conduit.

* * * * *